Jan. 13, 1959 L. S. HEYM 2,867,998

CONSTANT VELOCITY COUPLING

Filed Sept. 7, 1956

INVENTOR.
LOTHAR S. HEYM

BY W.B. Harpman

ATTORNEY

United States Patent Office 2,867,998

Patented Jan. 13, 1959

2,867,998

CONSTANT VELOCITY COUPLING

Lothar S. Heym, Youngstown, Ohio

Application September 7, 1956, Serial No. 608,581

2 Claims. (Cl. 64—7)

This invention relates to a coupling and more particularly to a constant velocity coupling.

The principal object of the invention is the provision of constant velocity coupling which may be simply and inexpensively produced and which will operate efficiently under various loads and at various angles.

A further object of the invention is the provision of a constant velocity coupling wherein the respective portions of the coupling are kept under slight tension so as to provide for an automatic take-up of slack resulting from wear during use.

A still further object of the invention is the provision of a completely enclosed coupling which may be lubricated and is thereby capable of retaining the lubricant indefinitely in the areas of the engaged portions of the coupling.

A still further object of the invention is the provision of a coupling which may be readily machined, quickly assembled and thereby produced at low cost.

The structure disclosed herein is an improvement with respect to the Universal Joint disclosed in my Patent No. 2,653,456 of September 29, 1953.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
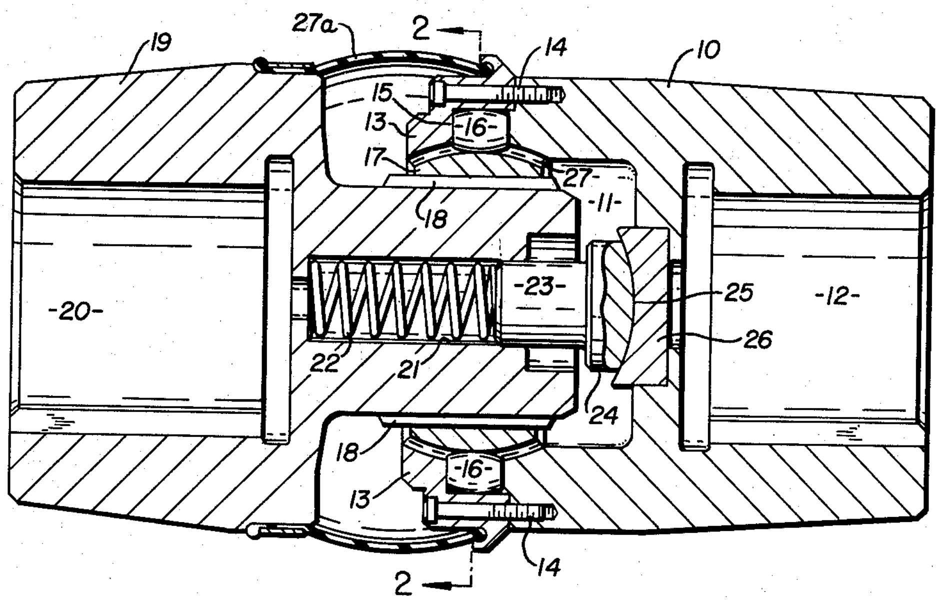
Figure 1 is a vertical section taken through the coupling.
Figure 2:
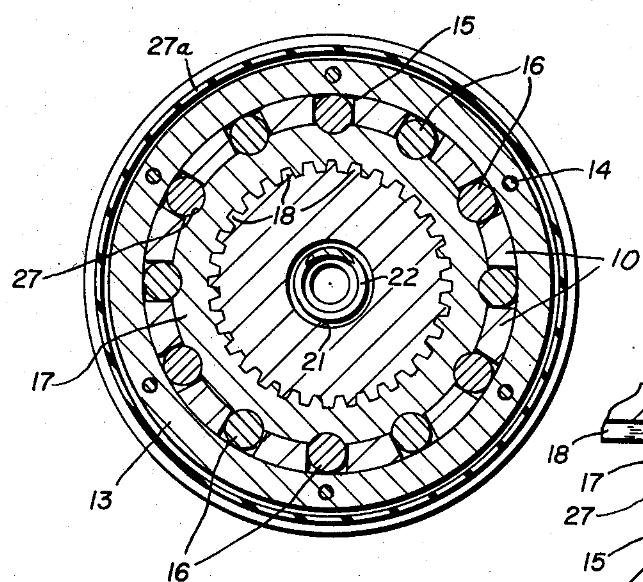
Figure 2 is a vertical section taken on line 2—2 of Figure 1.

By referring to the drawings and Figures 1 and 2 in particular it will be seen that the coupling comprises a driving member 10 having a socket 11 formed in one end forming an annular end portion thereabout which is of smaller diameter than the adjacent portion of said driving member 10. A secondary socket 12 is formed in the other end of the driving member 10 which is adapted to receive a motion transmitting shaft (not shown) which may be keyed thereto.

An inwardly flanged retainer ring 13 is secured to the outermost end of said annular end portion of the driving member 10 in partially overlying relation thereto as by a plurality of cap screws 14—14, and the flange thereof forms, in effect, an extension of said annular end portion.

The annular end portion of the driving member 10 is provided with a plurality of circumferentially spaced longitudinally extending parallel slots 15 adapted to receive a plurality of rollers 16—16, which are caged by the retainer ring 13.

The inner surfaces of the flange of the retainer ring 13 and the adjacent portion of the driving member 10 are formed in a spherical bore. The plurality of circumferentially spaced slots 15 are thus in effect positioned in the spherical socket formed by the flange of the retainer ring 13 and the adjacent annular end portion of the driving member 10 so that the rollers 16—16 disposed therein are positioned with their innermost surfaces inwardly of the spherical socket.

The rollers 16—16 are engaged in circumferentially spaced arcuate grooves 27 formed in the outer annular surface of a spherical ring gear 17 which is engaged on a splined surface 18 of a projecting end of a driven member 19. The driven member 19 has a socket 20 in its opposite end which is adapted to receive a torque transmitting shaft (not shown) which may be keyed thereto.

It will occur to those skilled in the art that while this disclosure refers to the member 10 as a driving member and the member 19 as a driven member, the function of said parts may be reversed.

The driving member 19 has a bore 21 formed inwardly of the projecting end thereof on the axial center line thereof, the bore 21 being adapted to cage a coil spring 22 and a plunger 23 which extends outwardly of the bore 21 and terminates in an enlarged head 24 having a spherical surface 25. A disc 26 having a matching spherical depression in the face thereof is positioned in the driving member 10 on the axial center line thereof for frictional engagement with the head 24.

A closure sleeve **27*a* is disposed between the retainer ring 13 and the driven member 19** and serves to confine lubricant in the operating area of the coupling.

Figure 3:
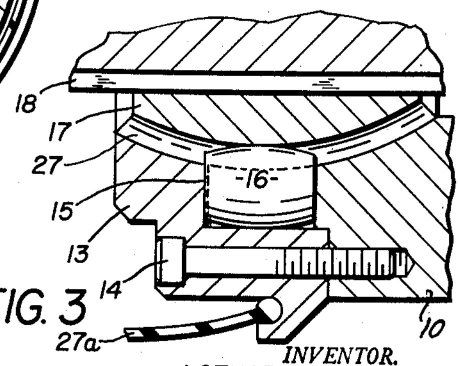
Figure 3 is an enlarged detail of the coupling taken through one of the rollers thereof with parts broken away.

By referring now to Figures 2 and 3 of the drawing, details of the construction just described may be seen.

In Figure 2 of the drawing the radial positioning of the circumferentially spaced slots 15 may be seen with the plurality of rollers 16—16 disposed therein.

In Figure 3 of the drawing an enlarged detail of one of the rollers 16 in a slot 15 will be seen in engagement with the spherical grooved ring gear 17, and it will be observed that it engages the arcuate groove 27 which is one of a plurality of such grooves formed in the periphery of the spherical grooved ring gear 17.

It will occur to those skilled in the art that when the coupling disclosed herein is in operation and the driving member 10 and the driven member 19 are disposed in angular relation to one another, the rollers 16 will engage the arcuate grooves 27 in the spherical ring gear 17 at different locations therealong as the parts rotate, and, due to the provision of the plurality of rollers 16 engaging the plurality of spherical grooves 27, at least one pair of opposing rollers 16 will have a velocity which is the same as that of the grooves 27 thereby making possible transmission of a constant velocity through the coupling.

It will further occur to those skilled in the art that relative movement between the driving member 10 and driven member 19 is possible due to the spline formation existing between the spherical grooved ring gear 17 and the projecting end of the driven member 19. The coupling is thus capable of taking up such motion as may occur without affecting the constant velocity of its motion. This same feature of the invention enables the coupling to adjust itself accurately to an ideal operating position despite irregularities in the positioning of the coupling shafts (not shown) and the angularity of the same with respect to one another.

Those skilled in the art will observe that the motion of the driving member 10 is thus imparted to the rollers 16—16, which are caged in the slots 15 therein, and that such motion is transmitted through the rollers 16—16 to the arcuate grooved spherical ring gear 17 and the driven member 19 by reason of the engagement of the rollers 16—16 in the grooves 27 of the ring gear 17 and the spline formation between the ring gear 17 and the projecting end of the driven member 19.

Figure 4:
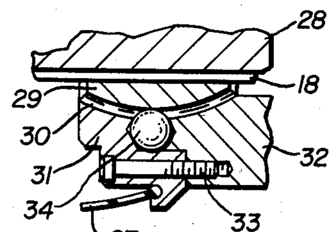
Figure 4 is a detail similar to Figure 3 illustrating a modified construction incorporating balls instead of rollers.

Those skilled in the art will recognize that modifications in the structure disclosed can be made within the scope of this invention and one such modification is illustrated in partial detail in Figure 4 of the drawing and wherein a portion of a projecting part 28 of a driven member is provided with an arcuate grooved ring gear 29, one of the grooves being indicated by the numeral 30.

The spherical socket of the modification is formed by a retainer ring 31 and an adjacent spherically ground surface of a slotted annular portion of a driving member 32. The parts 31 and 32 are secured together by cap screws 33. The slotted annular portion of the driving member 32 forms a plurality of circumferentially spaced, radially formed slots 34 which with the retainer ring 31 cage a plurality of ball bearings 35.

It will be observed that in the modification of Figure 4 of the drawing, like that of the preferred embodiment of the invention illustrated in Figures 1, 2 and 3 of the drawing, the arcuate grooves 30 permit the axial deflection of the respective parts of the coupling while at the same time maintains the ball bearing contact between the parts at all times.

Those skilled in the art will also observe that the spring urged plunger arrangement of the preferred embodiment of the invention will be advantageously employed in the modification of Figure 4 of the drawing, and which construction serves to take up wear occurring between the parts of the coupling.

It will thus be seen that a simple and efficient constant velocity coupling has been disclosed which may be easily and inexpensively formed and readily assembled and which will operate efficiently for its intended purpose and be capable of long and trouble-free life.

It will thus be seen that the several objects of the invention have been met by the constant velocity coupling disclosed herein.

Having thus described my invention, what I claim is:

1. In a constant velocity coupling, including a driving member having a spherical socket at one end, said spherical socket having a plurality of circumferentially spaced parallel slots therein and a plurality of rollers disposed one in each of said slots, and a driven member having a projecting end positioned within said spherical socket, an arcuate grooved spherical ring gear positioned on said projecting end for movement longitudinally thereof, said rollers engaging said arcuate grooves in said ring gear, the improvement comprising a plunger reciprocally mounted in said projecting end of said driven member, spring means normally urging said plunger outwardly therefrom and into engagement with said driven member.

2. In a constant velocity coupling including a driving member having a spherical socket in one end, said end being annular and having an outermost portion of relatively smaller diameter, said outermost portion having a plurality of circumferentially spaced inwardly extending parallel slots, a retainer ring secured to said driving member around and beyond said outermost portion and defining an extension of said spherical socket, a plurality of barrel-shaped rollers disposed one in each of said slots, said slots, rollers and retainer ring arranged so that a portion of each of said rollers extends inwardly of said spherical socket, a driven member having an extending cylindrical member disposed within said spherical socket in said driving member, a spline formation on the exterior of said cylindrical member and a ring gear having a matching spline formation disposed thereon for longitudinal movement with respect thereto, said ring gear having a plurality of circumferentially spaced arcuate grooves transversely of its outer surface, said plurality of arcuate grooves registering with said plurality of slots and rollers, the areas of said ring gear intermediate said arcuate grooves being of spherical contour, a plunger movably disposed in said cylindrical member and extending outwardly from the end thereof and having an enlarged curved head, spring means in said cylindrical member urging said plunger outwardly thereof, means defining a curved contoured disc disposed in said driving member and against which said plunger is engaged.

References Cited in the file of this patent

UNITED STATES PATENTS

| | | |
|---|---|---|
| 1,834,906 | Smith et al. | Dec. 1, 1931 |
| 1,916,442 | Rzeppa | July 4, 1933 |
| 1,975,758 | Stuber | Oct. 2, 1934 |
| 2,653,456 | Heym | Sept. 29, 1953 |

FOREIGN PATENTS

| | | |
|---|---|---|
| 467,917 | Great Britain | June 24, 1937 |